United States Patent
Albrich (10) Patent No.: US 6,550,392 B2
(45) Date of Patent: Apr. 22, 2003

(54) INSTALLATION FOR THE DOWNHILL TRANSPORTATION OF PASSENGERS FROM A HIGHER STATION TO A LOWER STATION

(75) Inventor: Reinhard Albrich, Dornbirn (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/062,057

(22) Filed: Feb. 1, 2002

(65) Prior Publication Data

US 2002/0108528 A1 Aug. 15, 2002

(30) Foreign Application Priority Data

Feb. 13, 2001 (AT) .......................................... 216/2001

(51) Int. Cl.[7] ............................................. E01B 25/00
(52) U.S. Cl. ..................... 104/89; 104/117.1; 104/113; 104/124; 104/178; 104/249; 104/250; 188/161
(58) Field of Search ............................. 104/27, 28, 53, 104/178, 55, 56, 59, 60, 63, 64, 69, 89, 113, 117.1, 124, 127, 128, 129, 281, 283, 238, 249, 250; 188/161, 165, 164; 472/85

(56) References Cited

U.S. PATENT DOCUMENTS

| | | | | |
|---|---|---|---|---|
| 3,625,317 A | * | 12/1971 | Baermann | 188/165 |
| 4,201,137 A | * | 5/1980 | Lagsdin | 104/119 |
| 4,221,170 A | * | 9/1980 | Koudelka | 104/120 |
| 4,236,454 A | * | 12/1980 | Erickson et al. | 104/119 |
| 4,271,762 A | * | 6/1981 | Wiegand | 104/118 |
| 4,335,658 A | * | 6/1982 | VanderKelen | 104/124 |
| 5,158,021 A | * | 10/1992 | Matsui et al. | 104/292 |
| 5,224,425 A | * | 7/1993 | Remington | 104/113 |
| 5,255,760 A | * | 10/1993 | Lamb et al. | 188/1.11 L |
| 5,739,610 A | * | 4/1998 | Nemoto et al. | 188/158 |
| 5,862,891 A | * | 1/1999 | Kroger et al. | 105/77 |
| 6,062,350 A | * | 5/2000 | Spieldiener et al. | 188/161 |
| 6,170,402 B1 | * | 1/2001 | Rude et al. | 104/53 |

FOREIGN PATENT DOCUMENTS

EP  1 026 061 A2  8/2000

* cited by examiner

*Primary Examiner*—Mark T. Le
(74) *Attorney, Agent, or Firm*—Laurence A. Greenberg; Werner H. Stemer; Ralph E. Locher (57) ABSTRACT

The installation enables the downhill transportation of passengers from a higher station to a lower station along a rail. Cars that are guided along the rail are equipped with the first of two interacting elements of an electromagnetic braking device, in particular with one or more permanent magnets, and the guide rail being equipped with the second elements, in particular braking strips made from an electrically conductive nonmagnetizable material, such as copper or aluminum, which interact with said first elements of the braking device. Each car is equipped with one or more first elements with an operating brake that is adjustable as a function of its load, and with one or more first elements of a safety brake that is activatable during downhill travel.

22 Claims, 6 Drawing Sheets

INSTALLATION FOR THE DOWNHILL TRANSPORTATION OF PASSENGERS FROM A HIGHER STATION TO A LOWER STATION

BACKGROUND OF THE INVENTION

Field of the Invention

The present invention relates to an installation for the downhill transportation of passengers from a higher station, i.e., a mountain station, to a lower station, i.e. a valley station, by means of cars guided along a rail. The cars are equipped with the first of two interacting elements of an electromagnetic braking device, in particular with one or more permanent magnets, and the guide rail is equipped with the second elements, in particular braking strips made from an electrically conductive nonmagnetizable material, such as copper or aluminum, which interact with the first elements of the braking device.

In order to meet the operational safety requirements of such installations, as disclosed in my earlier, copending patent application Ser. No. 09/488,741 (see corresponding European patent application EP 1 026 061 A2), it is necessary, first, for each car to be equipped with one or more braking devices, which are matched to the loading of the car, specifically the weight of the one or more passengers that travel down in the car in question, and, secondly, for a device to be provided whereby a collision between consecutively descending cars is prevented.

SUMMARY OF THE INVENTION

It is accordingly an object of the invention to provide an installation for moving persons from a mountain station into a valley station, which overcomes the above-mentioned disadvantages of the heretofore-known devices and methods of this general type.

With the foregoing and other objects in view there is provided, in accordance with the invention, aa installation for the downhill transportation of passengers from a higher station to a lower station, comprising:
a guide rail extending from the higher station to the lower station and cars guidable along the guide rail between the higher station and the lower station;
a brake system with interacting elements including first interacting elements mounted to the cars and second interacting elements mounted to the guide rail;
wherein each car is equipped with at least one of the first interacting elements of an operating brake and the at least one first interacting element is adjustable as a function of a load of the car, and with one or more first elements of a safety brake that is activatable during downhill travel of the car.

In accordance with an added feature of the invention, the brake system is an electromagnetic brake system having at least one permanent magnet forming the first interacting element. The second elements are preferably braking strips made from an electrically conductive nonmagnetizable material disposed to interact with the first elements of the brake system. In a further preferred embodiment, the braking strips are formed of copper or aluminum.

In other words, each car is equipped with one or more first elements, adjustable as a function of its load, of an operating brake and with one or more first elements, activatable during downhill travel, of a safety brake. As a result of the adjustability of the operating brake, the effect of the safety brake is matched to the current loading of the car. The safety brake provides control of the descending cars in such a way that collisions between consecutively descending cars during operation are excluded.

In accordance with a preferred embodiment, a testing station is provided at the higher station, by which testing station the one or more first elements of the operating brake can be set and by which the efficacy of the first elements of the operating brake and of the safety brake can be checked. Preferably, two rotatable testing disks made from electrically conductive, nonmagnetizable material, in particular copper or aluminum, and assigned to the first elements of the braking devices, together with a device for adjusting the one or more first elements of the operating brake relative to the position of the assigned testing disk and in addition a device for adjusting the one or more first elements of the safety brake from its inactive position to its active position are provided at the testing station. By rotation of the testing disks relative to the first elements of the operating brake and of the safety brake the efficacy and functionality of the first elements of the operating brake and of the safety brake provided on the cars can be checked at the testing station. Preferably, a first device for measuring the weight of the loaded car is additionally provided at the testing station, the outlet thereof being laid against the device for adjusting the one or more first elements of the operating brake, together with a second device for measuring the efficacy of the one or more first elements of the operating brake.

In accordance with another feature of the invention, the first elements of the braking device are disposed in pairs lying opposite one another, these being laterally outside the testing disks and the braking strips respectively. The measuring devices are also preferably formed by force transducers, in particular pressure pickups.

In accordance with a further feature of the invention, the one or more first elements of the operating brake are adjustable relative to the car, in particular by means of a threaded rod, the drive of the setting device being controllable by the first measuring device. Furthermore, a release device may be assigned to the one or more first elements of the safety brake, whereby the latter can be adjusted from the inactive position into the active position. In this case, the release device can preferably be released by a further setting device, especially a setting spring. Preferably, a device for adjusting the one or more first elements of the safety brake is also provided at the testing station.

In accordance with a concomitant feature of the invention, there are provided appliances for monitoring, in particular for measuring, the distance between two consecutive descending cars along the course of the guide rail extending from the higher station to the lower station, by means of which appliances the devices for releasing the first element of the safety brakes can be controlled.

Other features which are considered as characteristic for the invention are set forth in the appended claims.

Although the invention is illustrated and described herein as embodied in an installation for the downhill transportation of passengers from a higher station to a lower station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
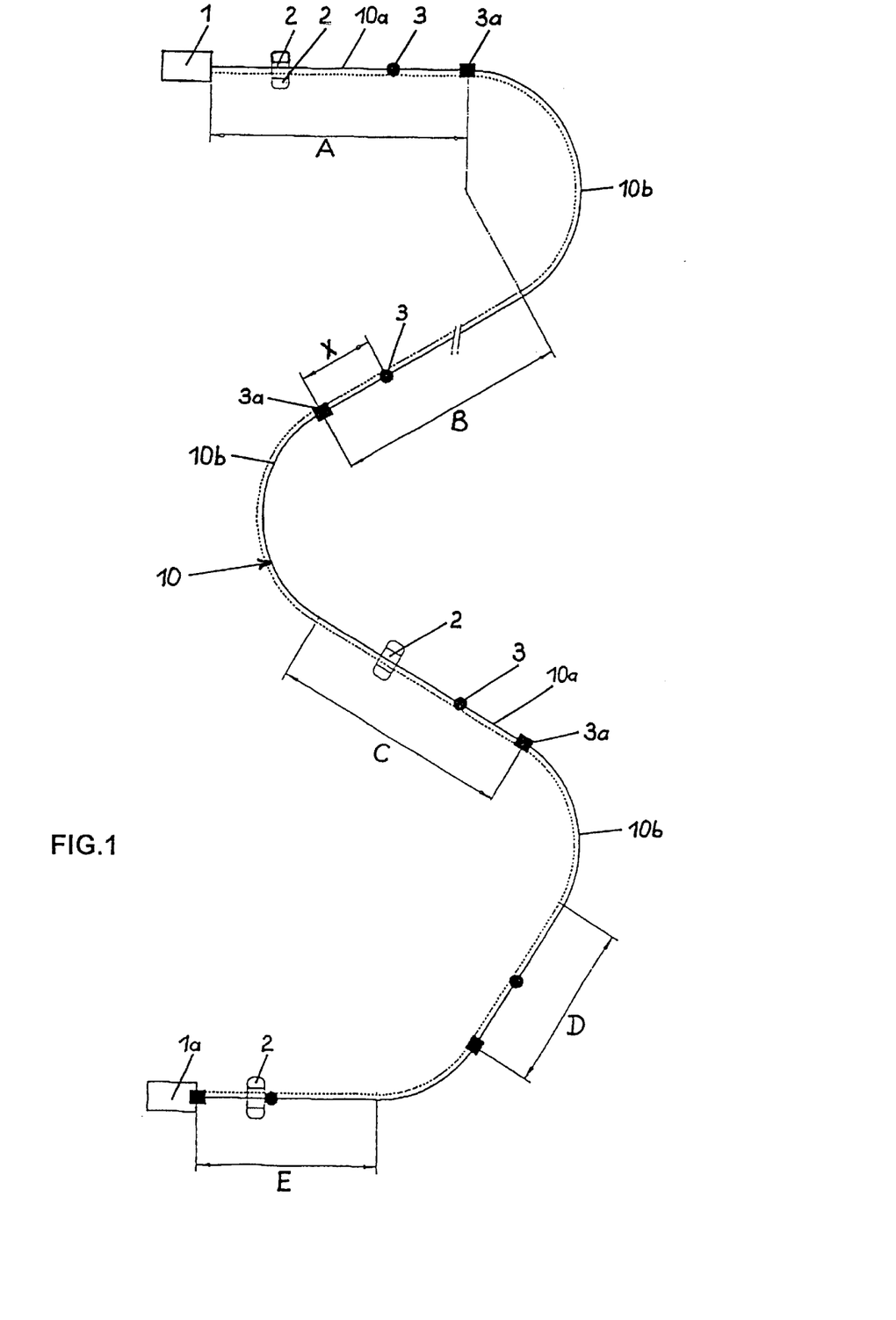
FIG. 1 is a general diagrammatic overview of an installation according to the invention, which is located between a higher station and a lower station.

Referring now to the figures of the drawing in detail and first, particularly, to FIG. 1 thereof, there is shown an installation according to the invention that includes a higher station 1 and a lower station 1a, between which there extends a continuous guide track 10. The guide track 10 is formed by rails supported by supports at a distance above the ground and along which cars 2 can descend from the higher station 1 to the lower station 1a. Devices 3 for triggering safety brakes are provided along the guide track 10, which is formed by a plurality of straight segments 10a and curved segments 10b. The safety brake trigger devices 3a re disposed before each of the curves 10b. In addition, further devices 3a, by means of which the cars 2 can be brought to a halt, are located downstream of these devices 3 in the direction of travel of the car 2.

Also located between the higher station 1 and the lower station 1a is an installation for conveying the empty cars 2 from the lower station 1a to the higher station 1.

Each of the cars 2 (i.e., carriages, bogies) is equipped with first elements of operating brakes and first elements of safety brakes, to which second elements of the operating brakes and of the safety brakes are assigned along the guide track 10. In a preferred embodiment, positionally adjustable permanent magnets are provided on the cars 2 as first elements of the operating brake and of the safety brake, to which braking strips made from an electrically conductive, non-magnetizable material, in particular from copper or aluminum, are assigned along the guide track 10. The operating brakes serve to limit the speed of downhill travel, which rises with the weight of the passengers in question, to a maximum of, for example, 20 km/hour. The safety brakes serve, in particular operating states, to reduce the speed of the descending cars 2 or bring them to a halt in order to prevent collisions between consecutively descending cars 2.

The guide track 10 is subdivided into a plurality of straight segments, which are designated as blocks A, B, C, D and E, these blocks A, B, C, D and E being connected to one another by the curved segments 10b. Located in each of the straight segments 10a is a device 3 for triggering the safety brake and a stop device 3a, which devices are disposed at a distance X from one another such that the speed of the car 2 in question is so greatly reduced that it can be brought to a halt at the stop device 3a.

At the higher station 1, each of the cars 2 is boarded by one or more passengers. The cars 2 then travel along the guide rail 10 from the higher station 1 to the lower station 1a. Sensors are provided along the line, by means of which the individual blocks A through E are monitored to ensure that only one car 2 is located in each block, that the speed of the cars 2 does not exceed a predetermined maximum value, that predetermined speeds are not exceeded in the areas of the curves 10b, and that a collision between consecutively descending cars 2 is prevented. These sensors control the devices 3, by which the safety brakes are activated, which in turn activate the safety brakes, which in turn greatly reduce the speed of the cars 2. These sensors also control the devices 3a, by which the cars 2 are halted.

As soon as the cars 2 arrive at the lower station 1a, the passengers alight and the cars 2 are then conveyed back to the higher station 1. The upward conveyance may be effected by a conventional upward track of the cableway and it, therefore, does not require a description or illustration.

Figure 2:
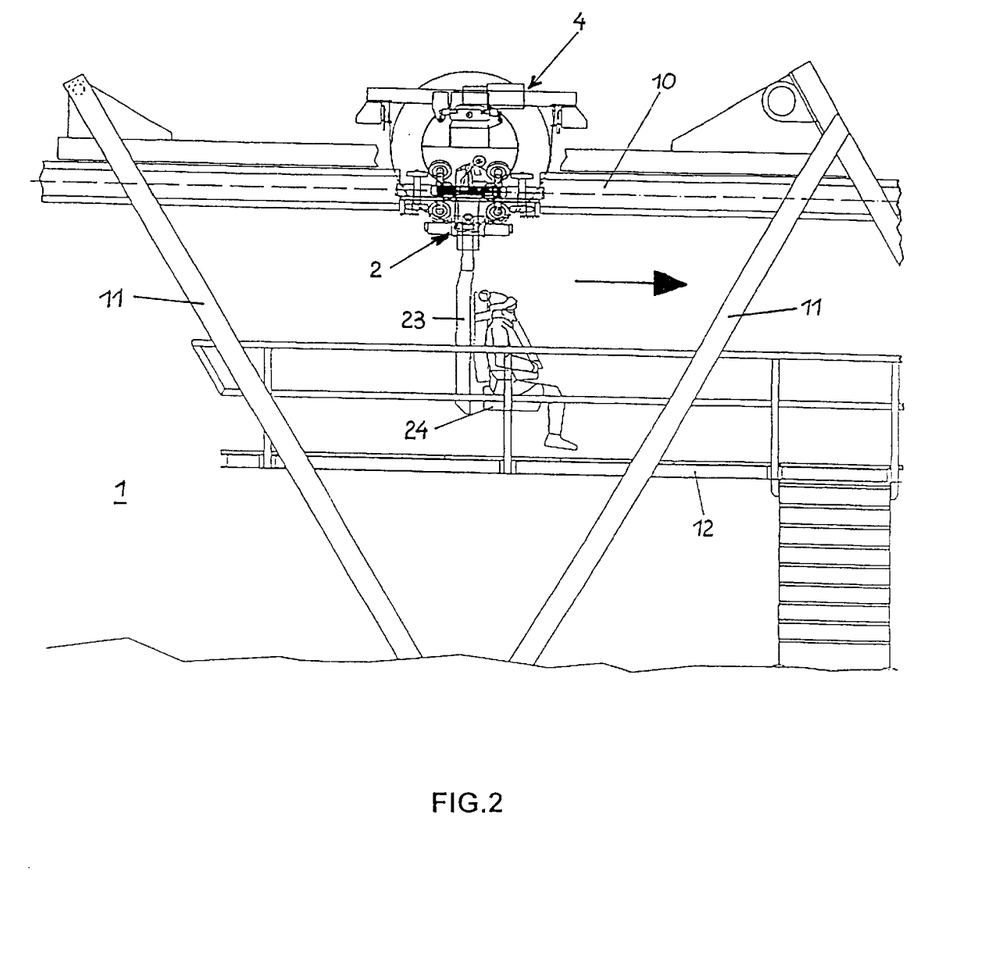
FIG. 2 is a side elevational view of a testing device located at the higher station.

With reference to FIG. 2, supports 11 by which the rail forming the guide track 10 is supported are located at the higher station 1, together with a platform 12 from which the passengers move, for example, onto seats 24 which are articulated by means of carrier bars 23 on the cars 2. Also located at the higher station 1 is a testing device 4, which will be explained in the following text with reference to FIGS. 3 and 4.

The cars 2 are equipped with a plurality of pairs of running wheels 21 and of guide wheels 22, with a gimbal mounting, provided with damping elements, for the carrier bar 23, and with friction surfaces 25. At the stations 1 and 1a, conveyor rollers are assigned to the friction surfaces 25 and the cars 2 are moved thereby.

Figure 3:
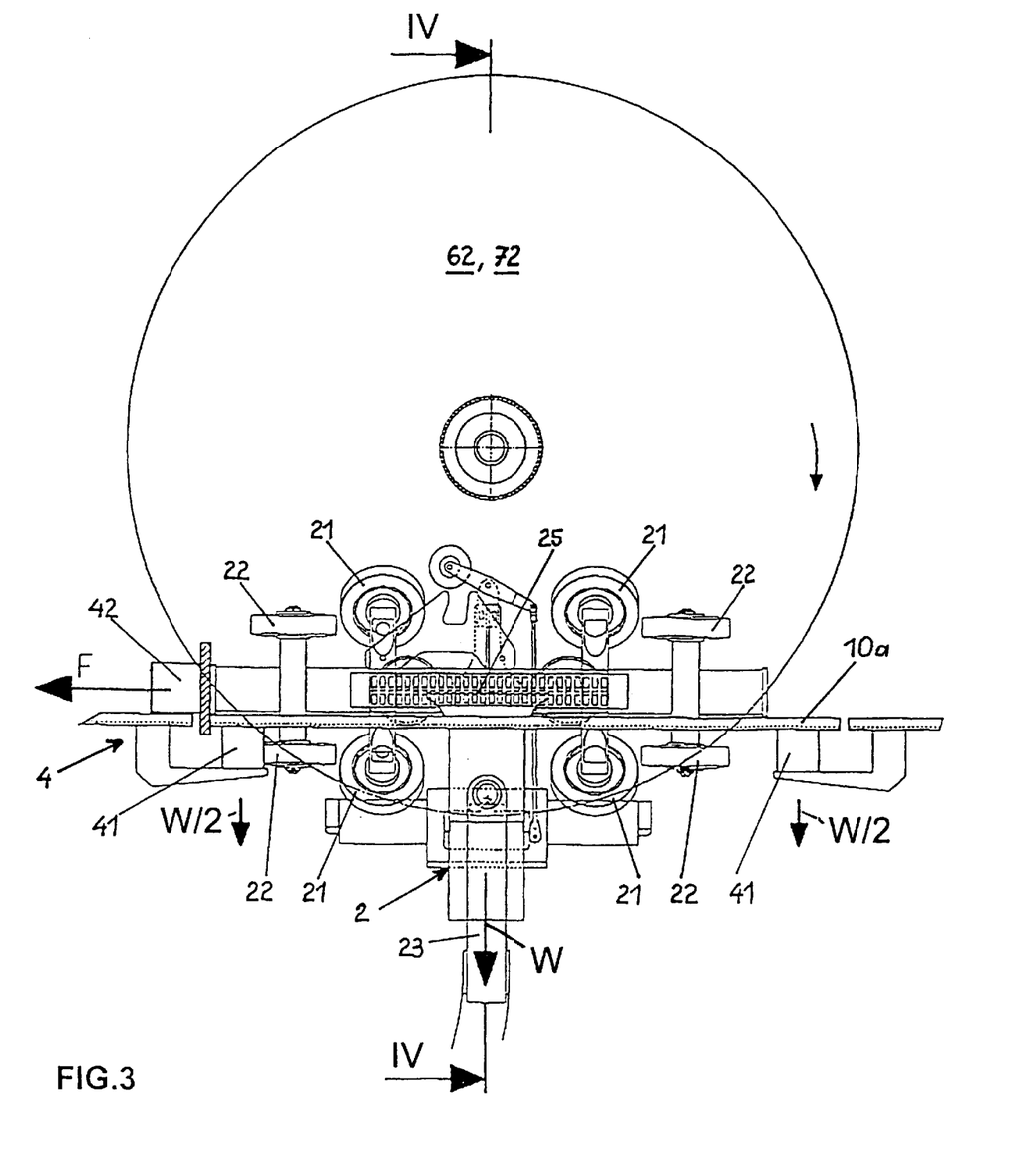
FIG. 3 is an enlarged, side elevational view of the testing device of FIG. 2.
Figure 4:
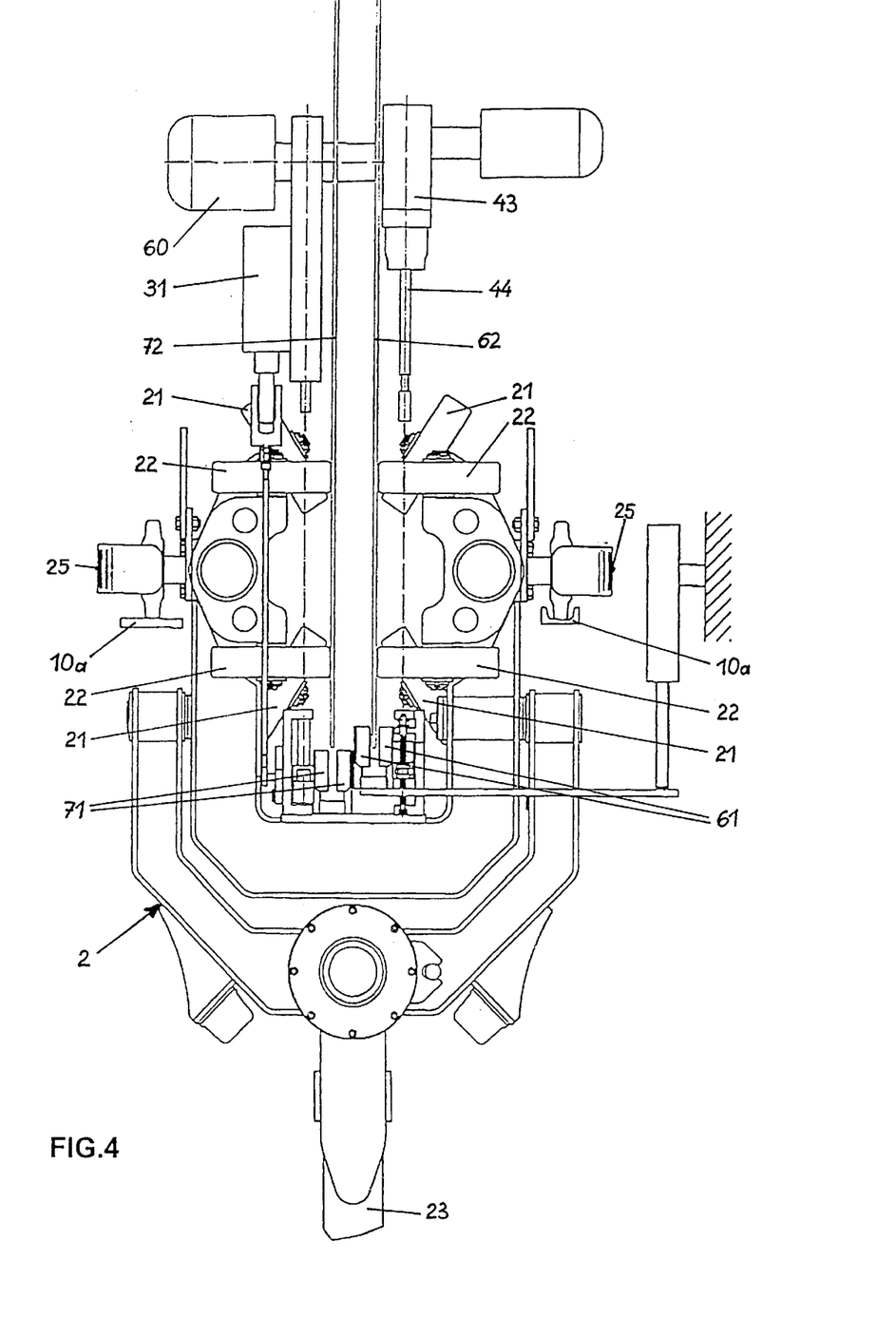
FIG. 4 is a section taken through the testing device along a line IV—IV in FIG. 3.

In the area of the testing device 4, wherein the guide rail 10 is interrupted, auxiliary rails 10a are provided, to which two first pressure pickups 41 are assigned, by means of which a weight W of the laden cars 2 can be measured. In addition, a second pressure pickup 42 is provided, whereby the functionality of the operating brake and of the safety brake can be measured. The outputs of the pressure pickups 41 are fed to a device 43 for adjusting the first elements, in particular permanent magnets 61, of the operating brake which are disposed on the car 2. The first elements 61 of the operating brake are adjustable as to their vertical position by this device 43, by means of a threaded rod 44, in order to achieve matching of the effect of the operating brake to the weight W of each laden car 2.

In addition, first elements 71 of a safety brake are located on the cars 2. The first elements 71 are adjustable by means of a control device 31 from a nonoperational position into the operational position. Test disks 62 and 72 drivable by a motor 60 are assigned to the first elements 61 and 71 of the operating brake and of the safety brake.

After the setting of the vertical position of the first elements 61 of the operating brake, and hence relative to the assigned test disk 62, the test disk 62 is caused to rotate by the motor 60 together with test disk 72 assigned to the first elements 71 of the safety brake, as a result of which a thrust force F is exerted upon the car 2 in its direction of movement. The thrust force F is recordable by the second pressure pickup 42. The efficacy of the operating brake is measured hereby, taking into account the loading W of the car 2. Subsequently, by means of the control device 31, the first elements 72 of the safety brake are adjusted into their operating position, as a result of which a further thrust is exerted on the car by the test disk 72 assigned to the elements, which is in rotation and can likewise be recorded by the second pressure pickup 42. The efficacy of the safety brake can also be checked hereby.

Figure 5:
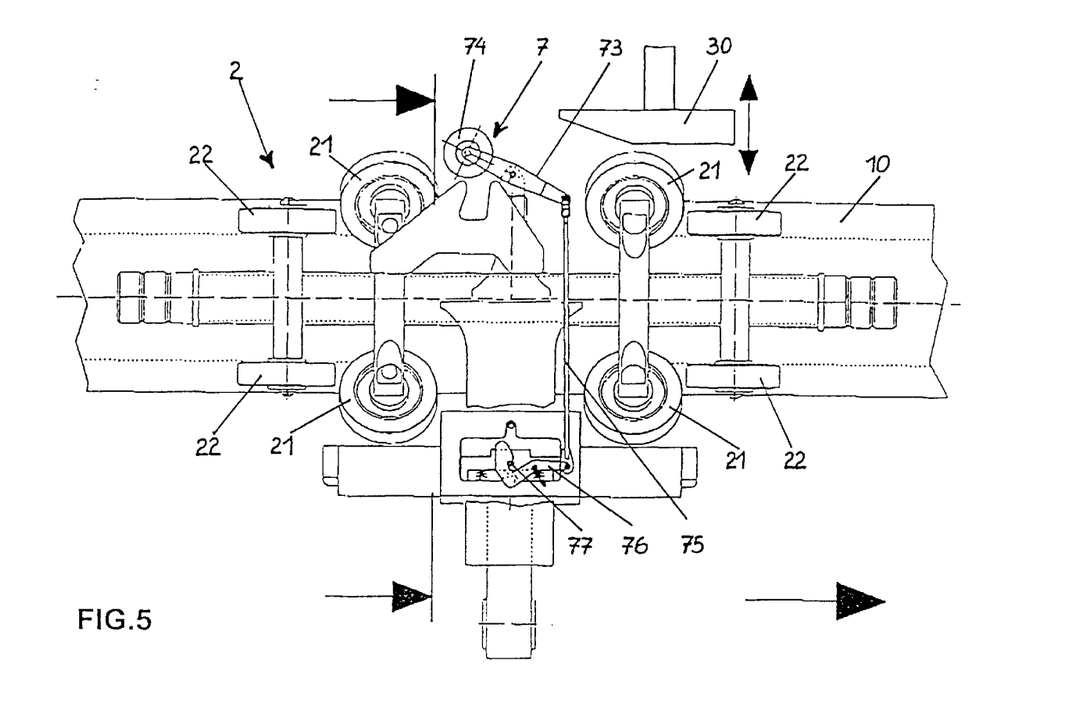
FIGS. 5 and 6 are side views of devices disposed along the line for releasing the safety brake, in two operating positions.
Figure 6:
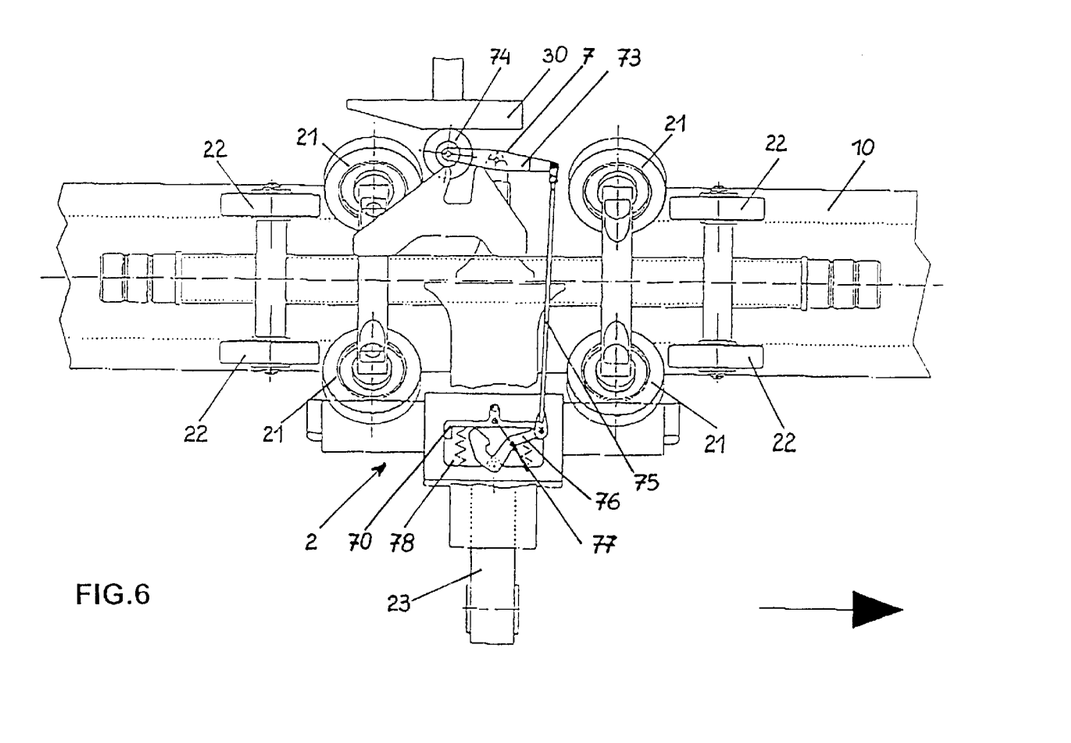

Each car 2 is additionally equipped with a device whereby the first elements 71 of the safety brake can be adjusted from their inactive position into their active position. This device is described in detail below with reference to FIGS. 5 and 6. As is apparent from FIG. 5, stops 30, the position of which relative to the car 2 can be set, are provided along the guide rail 10, trigger devices on the cars 2 being assigned to the stops to trigger the safety brake. The trigger devices 7 consist of a double-armed lever 73, which is provided with a roller 74 at one end which is assigned to the stops. Articulated on the other end of the lever 73 is a draw bar 75, which is coupled to a latching hook 76 (i.e., a pawl). In its starting position, the latching hook 76 locks a bolt 77, which projects from a support 70 for the first brake elements 71, as a result of which said support is held in that position wherein the first brake elements 71 are ineffective. As soon as the roller 74 runs on to one of the stops 30, the lever 73 and, via the draw bar 74, the latching hook 76 as well are pivoted counterclockwise, as a result of which the bolt 77 is released. The support 70 for the first brake elements 71 is then adjusted into its operating position under the action of a spring 78, as a result of which the safety brake becomes active. This position of the latching hook 76 and of the support 70 for the brake elements 71 is shown in FIG. 6.

Figure 7:
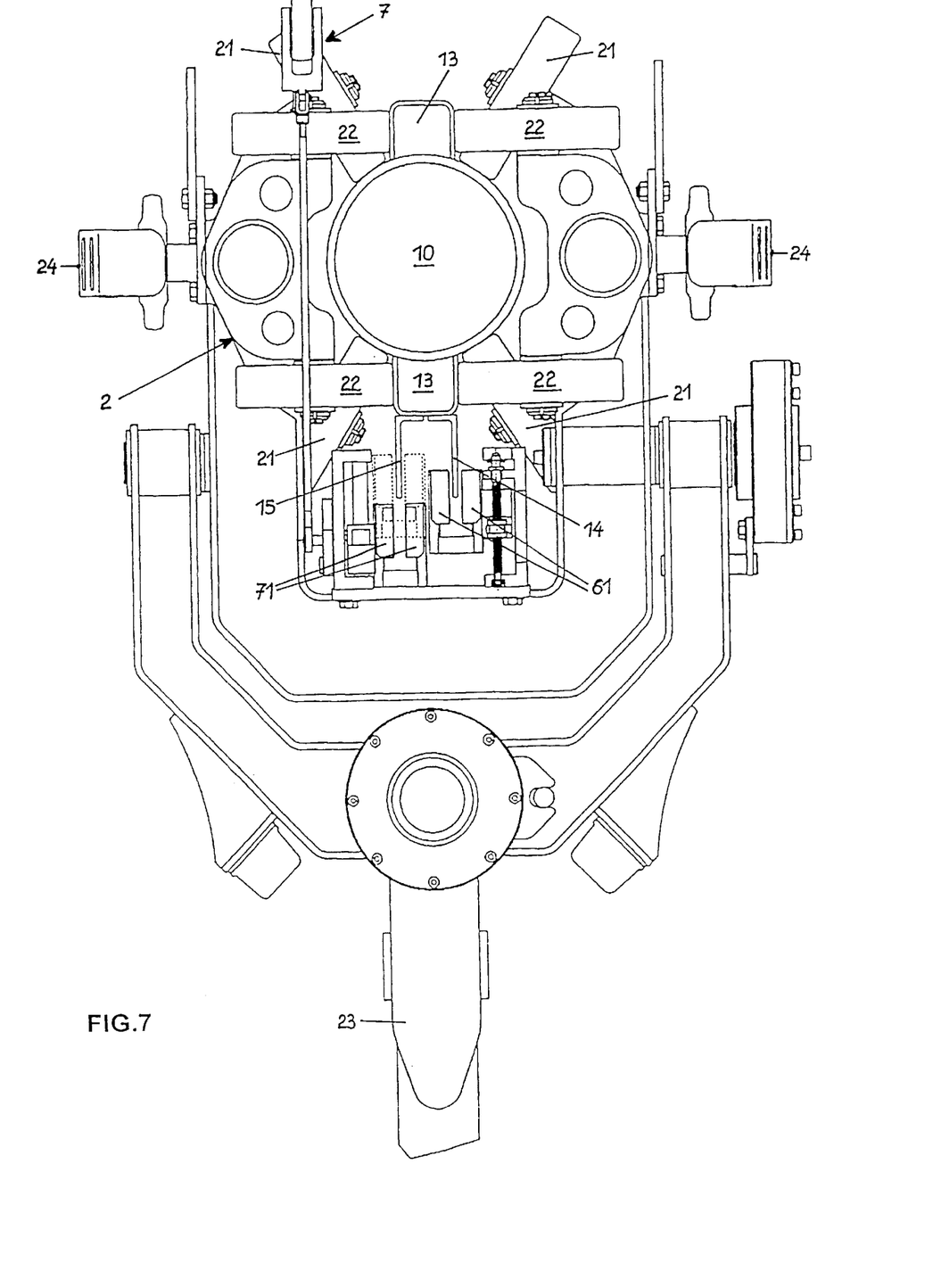
FIG. 7 is a partial enlarged end view of a car located on the line, in an end-on view.

With reference to FIG. 7, the guide rail 10, which is of circular or hexagonal form in cross section, is equipped with two projections 13 that are disposed diagonally opposite one another and that have an approximately square cross section. Side walls of the projections 13 form guide surfaces assigned to the guide rollers 22 of the car 2.

Two strips 14 and 15 project from the lower projection 13, these being made from electrically conductive, nonmagnetizable material, in particular copper or aluminum, and the pairs of first brake elements 61 and 71 of the operating brake and of the safety brake being assigned thereto. Because the brake elements 61 have been adjusted as to their vertical position at the test station 4 as a function of the loading of the car 2, they thus form, by interaction with the strip 14, an operating brake whereby the speed of the car 2 is limited to a predetermined value. The brake elements 71, which are shown in their inactive position, their active position being shown in broken lines, form together with the strip 15 a safety brake whereby the speed of the car 2 concerned is reduced to a very low value. The triggering of the safety brake is performed by the devices 3 disposed along the line, these being provided with the stops 30 by the adjustment of which the trigger devices 7 can be controlled. The devices 3 become active when the distance between two consecutively descending cars 2 falls below a minimum value. If a car 2 comes to a halt because of a defect, the following cars 2 are halted by the stop devices 3a. As soon as the safety brake has been activated, the car 2 travels down at very low speed to the lower station 1a. However, devices may also be provided whereby the safety brake is deactivated as a result of the braking elements 71 having returned to their inactive position.

I claim:

1. An installation for the downhill transportation of passengers from a higher station to a lower station, comprising:
   a guide rail extending from the higher station to the lower station and cars guidable along said guide rail between the higher station and the lower station;
   a brake system with interacting elements including first interacting elements mounted to said cars and second interacting elements mounted to said guide rail;
   wherein each car is equipped with at least one of said first interacting elements of an operating brake and said operating brake is adjustable as a function of a load of said car, and with one or more first elements of a safety brake that is activatable during downhill travel of said car; and
   a testing station disposed at the higher station for adjusting said operating brake as a function of the load of a respective said car.

2. The installation according to claim 1, wherein said brake system is a magnetic brake system having at least one permanent magnet forming said first interacting element.

3. The installation according to claim 2, wherein said second elements are braking strips made from an electrically conductive nonmagnetizable material disposed to interact with said first elements of said brake system.

4. The installation according to claim 3, wherein said braking strips are formed of a metal selected from the group consisting of copper and aluminum.

5. The installation according to claim 1, wherein said testing station is configured to set said first elements of said operating brake and to check an efficacy of said first elements of said operating brake and of said safety brake.

6. The installation according to claim 5, wherein said testing station includes two rotatable testing disks of electrically conductive, nonmagnetizable material assigned to said first elements of said brake system, a device for adjusting said first elements of said operating brake relative to a position of the respective said testing disk, and a device for adjusting said at least one first element of said safety brake from an inactive position to an active position thereof.

7. The installation according to claim 6, wherein said rotatable testing disks are formed of a metal selected from the group consisting of copper and aluminum.

8. The installation according to claim 5, wherein said testing station includes a weight-measuring device for measuring a weight of a loaded said car, said first weight-measuring device having an output connected to said device for adjusting said first element of said operating brake.

9. The installation according to claim 8, wherein said measuring device is a force transducer.

10. The installation according to claim 8, wherein said measuring device a pressure pickup.

11. The installation according to claim 5, wherein said testing station includes a measuring device for measuring an efficacy of said first elements of said operating brake and of said safety brake.

12. The installation according to claim 6, wherein said measuring device is a force transducer.

13. The installation according to claim 6, wherein said measuring device a pressure pickup.

14. The installation according to claim 5, wherein said first elements of said brake system are disposed in pairs opposite one another and laterally outside said testing disks and said braking strips, respectively.

15. The installation according to claim 5, wherein said first elements of said operating brake are adjustable relative to said car.

16. The installation according to claim 15, which comprises a threaded rod and a drive for said threaded rod controllable by said measuring device.

17. The installation according to claim 1 which comprises a release device connected to said at least one first element of said safety brake, whereby said safety brake is adjustable from an inactive position into an active position.

18. The installation according to claim 17, which comprises a setting device releasable by said release device.

19. The installation according to claim 18, wherein said setting device is a setting spring.

20. The installation according to claim 5, wherein said testing station includes a device for adjusting said at least one first element of said safety brake.

21. The installation according to claim 1, which comprises a plurality of monitoring devices disposed along said guide track from said higher station to said lower station for monitoring a distance between two consecutively descending cars, said monitoring devices controlling braking devices for controlling said first elements of said safety brakes.

22. An installation for transporting passengers from a higher station to a lower station, comprising:
   a guide rail extending from the higher station to the lower station and cars guidable along said guide rail between the higher station and the lower station;

a brake system including an operating brake and a safety brake each formed with first and second interacting elements mounted to said cars and to said guide rail, respectively;

wherein each car is equipped with at least one of said first interacting elements of said operating brake and said at least one first interacting element is adjustable as a function of a load of said car, and with at least on first element of said safety brake activatable during a downhill travel of said car from the higher station to the lower station; and a testing station disposed at the higher station for adjusting said operating brake as a function of the load of a respective said car.

* * * * *